(12) United States Patent
Welch et al.

(10) Patent No.: US 6,549,659 B1
(45) Date of Patent: Apr. 15, 2003

(54) METHOD AND APPARATUS FOR DETERMINING THE LOCATION OF A REFLECTIVE OBJECT WITHIN A VIDEO FIELD

(75) Inventors: Andrew Welch, 520 Altair Way, Venice, CA (US) 90291; Stephan Schaem, Portland, OR (US)

(73) Assignee: Andrew Welch, Venice, CA (US)

(*) Notice: Subject to any disclaimer, the term of this patent is extended or adjusted under 35 U.S.C. 154(b) by 1691 days.

(21) Appl. No.: 08/731,122

(22) Filed: Oct. 9, 1996

Related U.S. Application Data

(63) Continuation of application No. 08/303,063, filed on Sep. 8, 1994, now abandoned.

(51) Int. Cl.⁷ .................................................. G06K 9/46
(52) U.S. Cl. ........................................ 382/203; 382/282
(58) Field of Search .............................. 382/203, 165, 382/199, 282; 395/135; 348/586; 358/538, 540

(56) References Cited

U.S. PATENT DOCUMENTS

| | | | | |
|---|---|---|---|---|
| 4,435,835 A | * | 3/1984 | Sakow et al. | 382/48 |
| 4,992,780 A | * | 2/1991 | Penna et al. | 395/122 |
| 5,136,659 A | * | 8/1992 | Kaneko et al. | 382/203 |
| 5,216,498 A | * | 6/1993 | Matsunawa et al. | 382/48 |
| 5,222,154 A | * | 6/1993 | Graham et al. | 382/17 |
| 5,261,030 A | * | 11/1993 | Brooke | 395/135 |
| 5,291,563 A | * | 3/1994 | Maeda | 382/34 |
| 5,444,835 A | * | 8/1995 | Turkowski | 395/133 |

FOREIGN PATENT DOCUMENTS

| | | | | |
|---|---|---|---|---|
| GB | 2275401 | 12/1992 | | G06F/15/72 |

* cited by examiner

Primary Examiner—Yon J. Couso
(74) Attorney, Agent, or Firm—Blakely Sokoloff Taylor & Zafman

(57) ABSTRACT

A system and method for detecting the precise location of a reflective element in a video field wherein the determined location is subsequently utilized to generate a graphic to be added to a foreground video scene utilizing compositing techniques. A signal is generated specifying a precise point in the foreground video scene identifying a position of a reflective element. The signal is derived by comparing objects within the video field with a user specified size, shape and color. Graphics can be repositioned or lines or other graphic elements can be generated which track the movement of the reflective element.

8 Claims, 2 Drawing Sheets

METHOD AND APPARATUS FOR DETERMINING THE LOCATION OF A REFLECTIVE OBJECT WITHIN A VIDEO FIELD

This is a continuation of application Ser. No. 08/303,063 filed Sep. 8, 1994 now abandoned.

SUMMARY OF THE INVENTION

A system is disclosed for detecting the precise location of a reflective element in a video field wherein the determined location is subsequently utilized to generate a graphic to be added to a foreground video scene utilizing compositing techniques well known in the art. The system has application in many situations wherein it is desired to generate an image which is a composite of a foreground and background video. For example, weather broadcasts frequently utilize a composite video image wherein the weather person appears in front of a backing (typically blue) and the background video source is a weather map with clouds, temperatures, cold fronts and other graphics which may be added to the weather map in a predetermined sequence. Frequently, the weather person points to a position on the blue backing which corresponds to a position on the weather map at which a desired graphic is to appear, and, so long as the weather person's hand position and timing are correct, the graphic, such as a temperature for a particular city, appears in the composite video. However, with such systems, all graphics to be displayed must be positioned in advance and a sequence must be created which cannot be dynamically changed by the weather person other than, perhaps, to skip through or to the end of a particular preprogrammed sequence.

With the invented system, since a signal is generated specifying a precise point in the foreground video scene identifying a position the weather person is pointing at, as represented by a reflective element, graphics can be repositioned as desired by the weather person or lines or other graphic elements can be generated which track the movement of the reflective element.

Another possible use of the invented system is by a football analyst who can diagram a play showing the movement of various players by moving the reflective element across a frame of a background video scene of the playing field with the players lined up at the beginning of the play. The invention may also be used by military analysts to illustrate movement by ground, sea or air forces, either for public consumption or field officers, or wherever it is desired to illustrate a background video scene by a pointer device.

The invention is an improvement of the system described in co-pending application Ser. No. 07/867,048 filed Apr. 10, 1992 owned by the present assignee which is directed to an analog system for detecting the position of colored reflective objects in a video field having a spherical or generally spherical shape. The present invention is a digital system which is able to detect colored reflective objects which are much smaller in size than can be detected by the prior system and which may be of any shape and color.

DETAILED DESCRIPTION OF THE INVENTION

Figure 1:
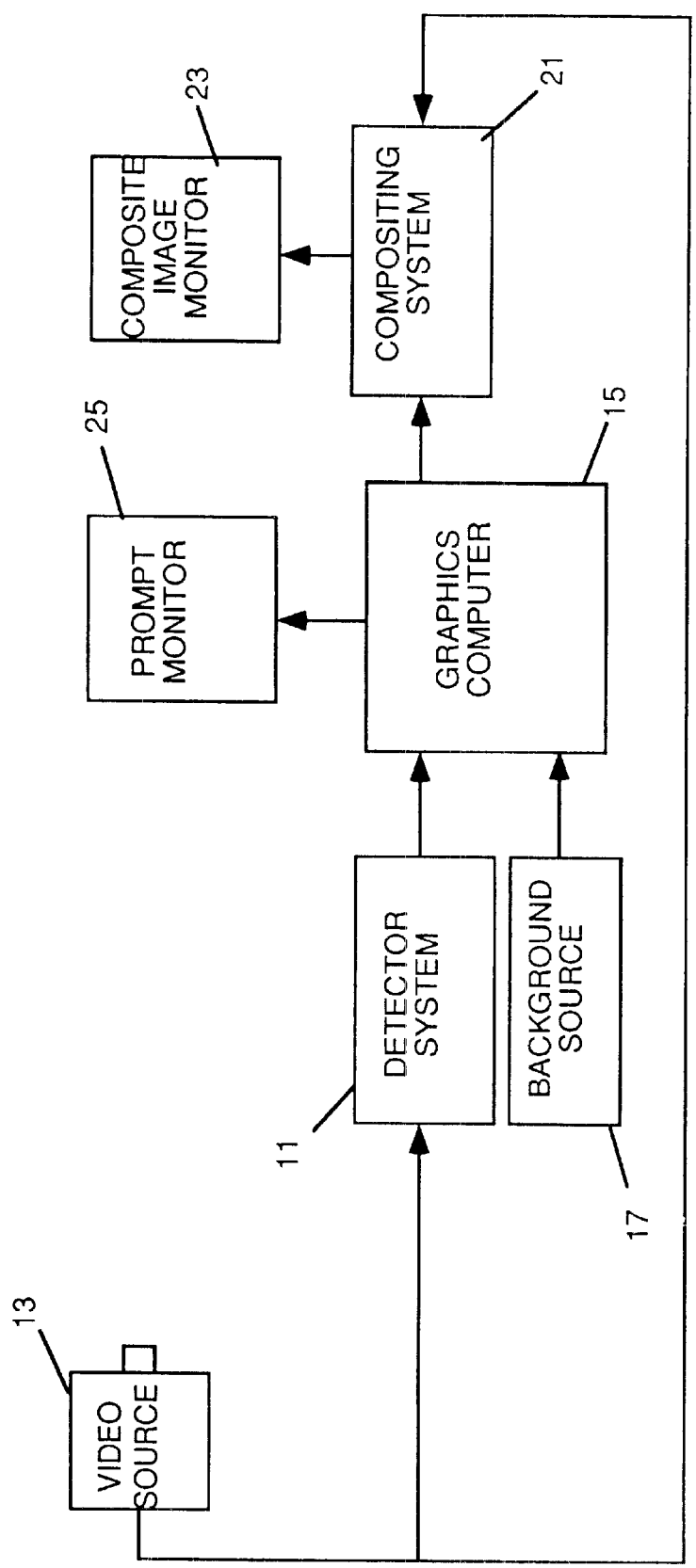
FIG. 1 is a block overview diagram showing a system in which the present invention may be utilized.

Referring to FIG. 1, the present invention is shown as detector system 11 which, along with a video source such as video camera 13, are all that are needed to practice the invention. However, for completeness, FIG. 1 shows other elements which would be utilized in conjunction with the invented system to provide composite images as described above. These additional elements include a graphics computer 15 which by itself or from a background source 17 provides a background video to compositing system 21. The background video includes the video from the background source or a video image preprogrammed into the graphics computer, plus graphics created by the graphics computer based upon inputs from the detector system. The compositing system 21 makes a composite image of the background image including graphics superimposed on the background image by the graphics computer along with the foreground video from video source 13. The superimposed graphics are generated as a result of inputs from the detector system. The composite image created by compositing system 21 is displayed on composite image monitor 23. Also shown is prompt monitor 25 which typically would display text for prompting the talent in the foreground scene as to the next element which will be appearing in the background.

Figure 2:
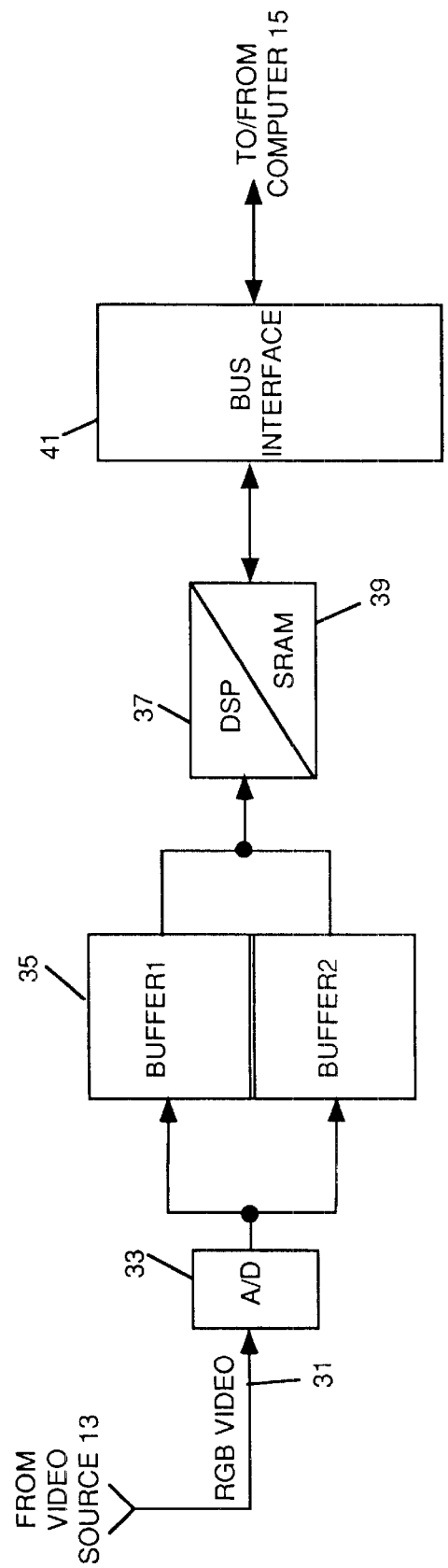
FIG. 2 is a block diagram of the invented detector system.

The invented detector system 11 is shown in block diagram form in FIG. 2. Referring first to FIG. 2, video camera 13 generates a conventional red, green and blue (RGB) signal containing the foreground video which is converted to three digital signals representing the video RGB signal by a B+254 triple channel 8 bit digitizer 33 with associated analog circuitry. The digitized signals are stored in a VRAM buffer 35 which is divided into two sections buffer1 and buffer2. The buffers are filled using timing signals such that while one buffer is being filled by digitized RGB signals from A/D converter 33, the other buffer is being read by digital signal processor 37 in a cyclical operation as commonly employed in the art.

Suitable modifications could be made that would allow the RGB signals from the camera to be replaced by some combination of luminance, chroma, and hue from the camera. Alternatively, ultraviolet light combined with camera filtering could be used to produce the desired peak signal. However, in the preferred embodiment RGB signal processing is utilized.

Digital signal processor 37 reads and processes the RGB signals in buffer 35 to detect the position in a field of video of an object having a user specified size, shape and color.

The following is a pseudo code description of the processing performed by a suitable digital signal processor 37. Assumptions made are that the user has specified ranges of values for each of red, blue and green which the object to be detected must contain; the shape is a sphere whose dimensions are at least 3 pixels by 3 pixels; and the color to be detected is specified by capturing a reference color through a camera or other video source.

The buffer format in this case is xRGB where each of x, R, G and B is assigned a byte used to store corresponding values representing a single pixel. In the present embodiment of the invention, R represents the red value, G represents the green value, B represents the blue value of the pixel and x is unused, but is available to represent transparency or where the color space uses four variables to represent color instead of three.

---

XSize = XSize in pixels of Buffers
XSize = YSize in pixels of Buffers

-continued

```
RedMin = User Defined
RedMax = User Defined
GreenMin = User Defined
GreenMax = User Defined
BlueMin = User Defined
BlueMax = User Defined
PixelSize = 4
/* 4 bytes per xRGB pixel; Undefined/Red/Green/Blue */
XPos = Unknown
YPos = Unknown
/* The last X/Y position of the object */
SearchObject( ) {
    YPos = 0
    while (YPos < YSize) {
        XPos = 0;
        While (XPos < XSize) {
            If (CheckColor(XPos, YPos)) {
                If (CheckSize( )) {
                    return (TRUE)
                }
            }
            XPos = XPos+1
        }
        YPos = YPos+1
    }
    return (FALSE)
}
CheckColor (X, Y) {
    Red = Buffer [1+X*PixelSize+Y*xSize*PixelSize]
    Green = Buffer [2+X*PixelSize+Y*XSize*PixelSize]
    Blue = Buffer [3+X*PixelSize+Y*Size*PixelSize]
    if((Red >= RedMin) && (Red <= RedMax)) {
        if((Green >= GreenMin) && (Green <= GreenMax)) {
            If(Blue >= BlueMin) && (Blue <= BlueMax)) {
                return (TRUE)
            }
        }
    }
    return (FALSE)
}
CheckColor (X, Y) {
    Red = Buffer[1+X*PixelSize+Y*XSize*PixelSize]
    Green = Buffer [2+X*PixelSize+Y*XSize*PixelSize]
    Blue = Buffer{3+X*PixelSize+Y*XSize*PixelSize]
    if ((Red >= RedMin) && (Red <= RedMax)) {
        if ((Green >= GreenMin) && (Green <= GreenMax)) {
            If (Blue >= BlueMin) && (Blue <= BlueMax)) {
                return (TRUE)
            }
        }
    }
    return (FALSE)
}
CheckSize( ) {
    X1 = XPos
    X2 = XPos
    Y1 = YPos
    Y2 = YPos
    while ((CheckColor (X1, YPos) == TRUE) && (X1 >0)) {
        X1 = X1-1;
    }
/* Now X1 is the Left edge position of the object */
    while ((CheckColor (X2,YPos) == TRUE) && (X2 <= XSize)) {
        X2 = X2+1;
    }
/* Now X2 is the Right edge position of the object */
    while((CheckColor(XPos, Y1) == TRUE) && (Y1 >0)) {
        Y1 = Y1-1;
/* Now Y1 is the Top edge position of the object */
    while ((CheckColor(XPos,Y2) == TRUE) && (Y2 <= XSize)) {
        Y2 = Y2+1;
/* Now Y2 is the bottom edge position of the object */
    Width = X2 - X1
/* Now Width is the width of the object with XPos and YPos as the
center */
    Height = Y2 - Y1
/*Now Height is the height of the object with XPos and YPos as the
center */
    if((Width < 3) || (Height < 3) || (abs(Width − Height) > 3)) {
        return(FALSE)
    }
    return(TRUE)
/*Return false if the Width or Height is smaller than 3 pixels, or if the
difference between the Width and Height is greater than 3 */
}
```

The invention operates by capturing an analog RGB video signal 31 which has been converted by A/D converter 33 to a 24 bit true color form stored in a VRAM buffer 35. VRAM 35 stores two video fields so that a current video field is stored in one portion of the buffer (designated buffer1) and the next video field is stored in another portion of the buffer (designated buffer2). While one field is being captured in one of buffer1 or buffer2, the data in the other one of buffer1 or buffer2 is processed by DSP 37 according to the pseudo code which generates an output defining a contour based on chroma/luminance differences, i.e., the size and color and shape of an object within the current buffer area, i.e., buffer1 or buffer2 being processed. The color, minimum size, and spherical shape of the video are compared with the color specified by the user and the minimum size/spherical shape specified by the user to determine if the object to be tracked is within the portion of the image currently being examined. If a match is detected, the routine SearchObject( ) returns TRUE, otherwise it returns FALSE and the next buffer area is processed. Once the processing of the data in the current one of buffer1 or buffer2 has been completed, the process is repeated on the data in the other one of the buffer1/buffer2 pair. The process of loading one buffer while processing the other continues so long as it is desired to track the object. Since the data is being loaded into VRAM buffer 35 at the rate of 30 frames per second, i.e., 60 fields per second, each one of buffer1 and buffer2 must be processed in ¹⁄₆₀ of a second. This can be accomplished by a DSP using one of numerous commercially available microprocessors such as Motorola 680x0.

As each video field is processed, SRAM 39 is used to store the various variables required for and produced by the processing. These variables are as follows:

XSize: the size of the x dimension of VRAM buffer 35 in pixels.

YSize: the size of the y dimension of VRAM buffer 35 in pixels.

RedMin: the minimum value of the red component of the object to be tracked.

RedMax: the maximum value of the red component of the object to be tracked.

BlueMin: the minimum value of the blue component of the object to be tracked.

BlueMax: the maximum value of the blue component of the object to be tracked.

GreenMin: the minimum value of the green component of the object to be tracked.

GreenMax: the maximum value of the green component of the object to be tracked.

PixelSize: a variable indicating the number of bytes used to store the values for Red, Green, Blue and x.

XPos: the X or horizontal position of the center of the detected object within the video field in pixels from the origin (typically, the origin is the upper leftmost pixel in the video field).

YPos: the Y or vertical position of the center of the detected object within the video field in pixels from the origin (typically, the origin is the upper leftmost pixel in the video field).

X: a local variable corresponding to XPos
Y: a local variable corresponding to YPos
Red: the red value of the pixel currently being processed.
Green: the green value of the pixel currently being processed.
Blue: the blue value of the pixel currently being processed.
X1: variable used to find the left edge of the reflective object.
Y1: variable used to find the top, edge of the reflective object.
X2: variable used to find the right edge of the reflective object.
Y2: variable used to find the bottom edge of the reflective object.
Width: the width of the object with XPos and YPos as the center Height: the height of the object with XPos and YPos as the center. SRAM 39 may be implemented using commercially available static random access memory, the specifics of which would depend on the DSP being used.

Communications with main computer supplying user defined information allowing the user to set the user defined variables defining the color and size of the object to be tracked by writing to SRAM 39. Also, the computer reads the XY position from the SRAM 39.

Once an object has been detected, the position of the detected object (XPos and YPos) is passed to graphics computer 15 through bus interface 41 which uses this information as in the prior art. Bus interface 41 is also used to pass information from the graphics computer 15 or other host which is used by DSP 37. The information which is passed from host is the RedMin, RedMax, BlueMin, BlueMax, GreenMin, GreenMax values set by the user. Bus interface may be implemented using for example, ISA bus or other suitable bus interface.

We claim:

1. A system for creating a composite video signal having a background portion and a foreground portion, said foreground portion representing a foreground scene containing a moving reflective object having a predetermined color and size, said foreground portion defined by a field of video information provided by a video source having red, blue and green components, said red, blue and green components having been converted to a digital representation, said system comprising:

a) color comparison means for comparing the component of said red, blue, and green video signal, corresponding to the color of said reflective object, to predefined minimum and maximum red, green and blue values, and generating a first signal representing the results of said comparison;

b) means for computing the size and shape of an object within a video field, by scanning in left, right, top, and bottom directions for pixels having a predefined color;

c) size and shape comparison means for comparing the size and shape of said pixels having said predefined color to a predefined size and shape and generating a second signal representing the results of the comparison;

d) means for specifying the relative position of said reflective object within said video field when said first and second signals indicate that the pixels match the predefined color, size and shape;

e) means for supplying the specified relative position to a graphics computer which uses the supplied position to generate a computer generated graphical image represented by signals which are added to said background portion in real time for displaying the graphical image at the specified relative position on a display device such that the graphical image tracks the movement of said reflective object as it moves in said video field.

2. The system defined by claim 1 wherein said color comparison means comprises:

a) a buffer containing said digitized red, green and blue components:

b) a memory containing predetermined minimum and maximum red, green and blue values defining the color of an object to be tracked; and c) a digital signal processor coupled to said buffer and said memory, said digital signal processor executing a program which obtains red, green and blue values of pixels corresponding to said digitized red, green and blue components and compares the obtained values of said pixels with predetermined minimum and maximum red, green and blue values to determine whether said pixels correspond to a color within the range of said predetermined minimum and maximum red, green an blue values defined for said reflective object.

3. The system defined by claim 1 wherein said means for computing the size and shape of said object comprises:

a) a buffer containing said digitized red, green and blue components:

b) a memory containing predetermined minimum and maximum red, green and blue values defining the color of an object to be tracked;

c) a digital signal processor coupled to said buffer and said memory, said digital signal processor executing a program which obtains red, green and blue values of pixels corresponding to said digitized red, green and blue components and compares the obtained values of said pixels with predetermined minimum and maximum red, green and blue values and calculates left, right, top and bottom borders of the reflective object within said video field by searching said video field to the left, right, top, and bottom of a starting pixel for pixels having a predetermined color.

4. A method for creating a composite video signal having a background portion and a foreground portion, said foreground portion representing a foreground scene containing a moving reflective object having a predetermined color and size, said foreground portion defined by a field of video information provided by a video source having red, blue and green components, said red, blue and green components, having been converted to a digital representation, said method comprising the steps of:

a) comparing the component of a said video signal corresponding to the color of said reflective object to a predefined color generating a first signal representing the results of said comparison;

b) computing the size and shape of an object within a video field, by scanning in left, right, top, and bottom directions for pixels having a predefined color;

c) comparing the size and shape of said pixels having said predefined color within said video field to a predefined size and shape and generating a second signal representing the results of the comparison;

d) specifying the relative position of said reflective object within said video field when said first and second signals indicate that the pixels match the predefined color, size and shape; and e) supplying the specified relative position to a graphics computer which generates an image signal to be added to said background portion in real time for displaying a graphical image at the specified relative position on a display device such that the graphical image tracks the movement of said reflective object as it moves in said video field.

5. The method defined by claim 4 wherein said color comparison step comprises the steps of:

a) storing said digitized red, green and blue components in a buffer;

b) storing in a memory predetermined minimum and maximum red, green an blue values defining the color of an object to be tracked;

c) obtaining red, green and blue values of pixels corresponding to said digitized red, green and blue components and compares the obtained values of said pixels with predetermined minimum and maximum red, green an blue values to determine whether said pixels correspond to a color within the range of said predetermined minimum and maximum red, green an blue values defined for said reflective object.

6. The method defined by claim 4 wherein said size and shape calculation step comprises the steps:

a) storing said digitized red, green and blue components in a buffer;

b) storing in a memory predetermined minimum and maximum red, green an blue values defining the color of an object to be tracked;

c) obtaining red, green and blue values of pixels corresponding to said digitized red, green and blue components and comparing the obtained values of said pixels with predetermined minimum and maximum red, green an blue values; and d) calculating left, right, top and bottom borders of the reflective object within said video field by searching said video field to the left, right, top, and bottom of a starting pixel for pixels having a predetermined color.

7. The system defined in claim 3 wherein the relative position of said object corresponds to a position of said starting pixel within said video field.

8. The method defined in claim 6 wherein the specified relative position of said object corresponds to a position of said starting pixel within said video field.

* * * * *